(No Model.) 2 Sheets—Sheet 1.
R. G. PATTON.
HARROW.
No. 386,845. Patented July 31, 1888.
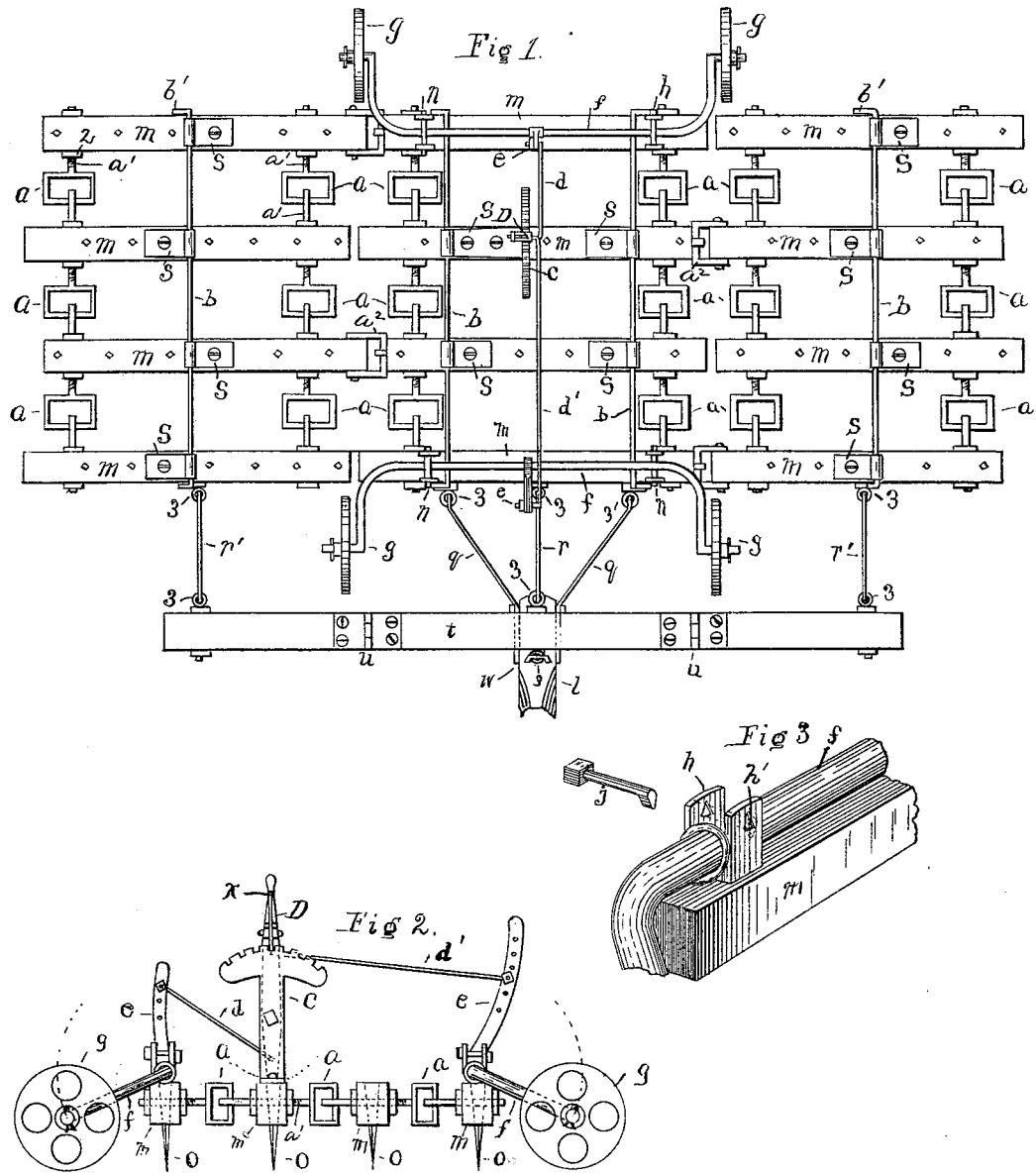
Witnesses
L. M. Thurlow
M. V. Hammond
Inventor
Robert G. Patton (No Model.) 2 Sheets—Sheet 2.
R. G. PATTON.
HARROW.
No. 386,845. Patented July 31, 1888.
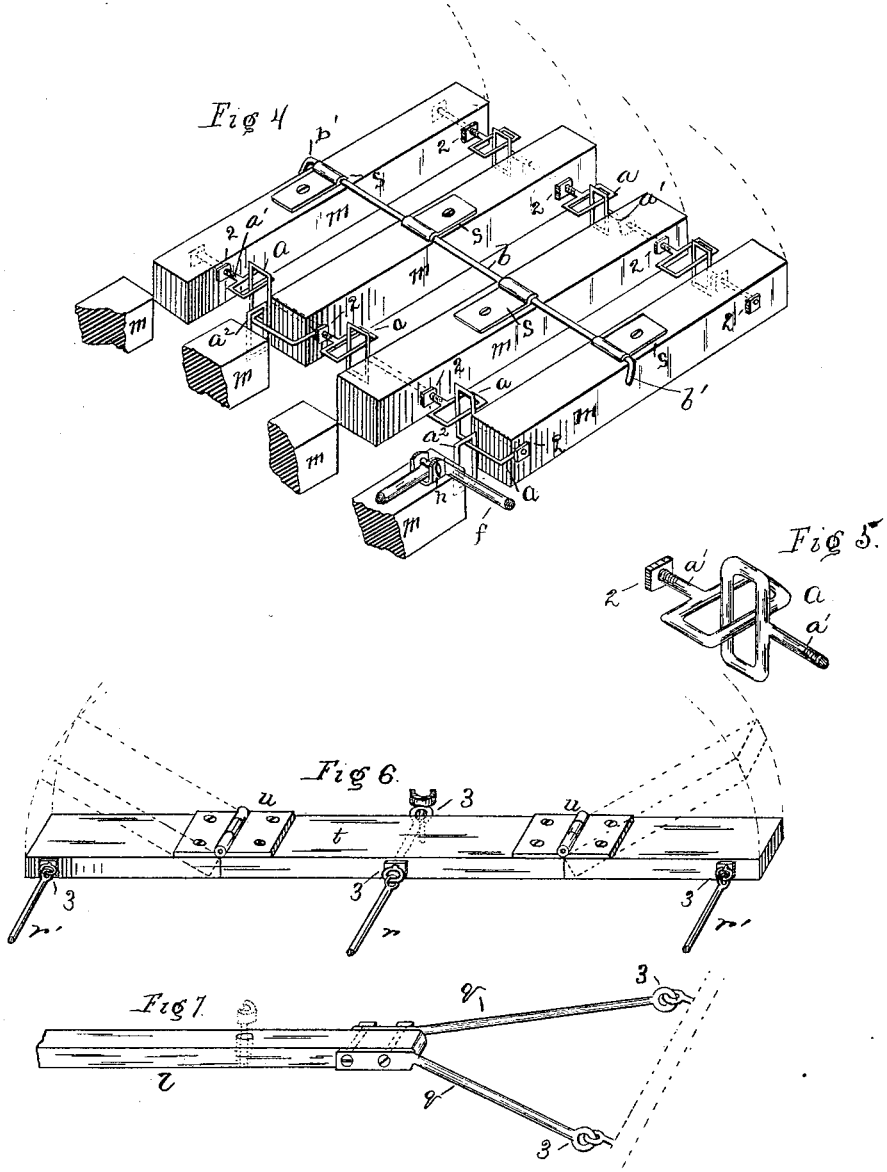

UNITED STATES PATENT OFFICE.

ROBERT G. PATTON, OF HANNA CITY, ILLINOIS.

HARROW.

SPECIFICATION forming part of Letters Patent No. 386,845, dated July 31, 1888.

Application filed February 10, 1888. Serial No. 263,636. (No model.)

*To all whom it may concern:*

Be it known that I, ROBERT G. PATTON, a citizen of the United States, residing at Hanna City, in the county of Peoria and State of Illinois, have invented a certain new and useful Improvement in Field-Harrows, of which the following is a specification.

My invention relates particularly to toothed harrows and to means whereby the same may be transported from place to place without the teeth dragging in contact with the surface of the ground.

In the accompanying drawings, illustrating my invention, Figure 1 is a top plan view of a harrow made up of three sections, showing the transporting device in place. Fig. 2 is an end view of the same. Fig. 3 is a detached perspective view, enlarged. Fig. 4 is a perspective view illustrating the means for uniting the harrow-sections. Fig. 5 is a perspective view of the coupling clevises or eye or loop bolts by which the harrow-bars are united to each other, and Figs. 6 and 7 are perspective views illustrating the draft devices.

While I have illustrated my invention applied to a harrow made up of three sections, it will be apparent that, so far as the main features thereof are concerned, they are equally applicable to a harrow of a single section or to one having more sections than that shown.

Each section consists of a number of cross-bars, $m$, four being shown, which may be of wood or other suitable material, carrying the harrow-teeth $o$ and flexibly united to each other by clevises or eye or loop bolts. These bolts, (shown detached in Fig. 5,) consist of stem portions $a'$, adapted to pass through bars $m$ and be secured thereto by clamping-nuts 2, engaging with the screw-thread ends thereof, and provided at their opposite ends with eyes or elongated loops $a$, adapted to interlock with each other. These hinging or uniting bolts will usually be made in pairs, with their loops welded to interlock, as shown, and are attached to the bars, so as to have the loops lie at right angles to each other, preferably one in a vertical and the other in a horizontal plane.

The separate bars $m$ of each section are further united by a rigid cross-bar, $b$, preferably of round iron, connected to the bars by plates $s$ and having its ends bent at $b'$ and engaging with the outer bars $m$, and thereby serving to hold the bars in place. This bar $b$ is arranged about centrally between the ends of the bars $m$, and serves as a hinge-bar or rod, upon which each bar $m$ can rock independently of each other bar, to suit the inequalities of the ground, by reason of the flexible connections $a$.

Two adjacent sections may be united to each other, so as to give the harrow the desired amount of flexibility and permit independent motions of the sections as wholes in any desired manner—as, for instance, by the loop-like coupling $a^2$.

In order that the harrow may be easily transported from place to place without having the teeth drag upon the ground, I support the same upon wheels $g$, mounted upon frames—one at the front and the other at the rear portion of the harrow—adapted to be moved to bring such wheels either into or out of contact with the ground. Such a frame is shown as consisting of a cranked rocking axle, $f$, supported, as shown best in Fig. 3, in bearings $h$, carried by one of the bars $m$, in which bearings it is secured by keys or pins $j$, passing through apertures $h'$ in the bearings $h$. The wheels and their supporting-frames may be readily removed when it is not desired to use them by withdrawing the keys $j$, which leaves the axle-seats in the bearings open, when the axles may be lifted out.

I have shown an arrangement whereby the wheel-frames may be rocked in their supports, so as to bring the wheels into and out of engagement with the ground without necessitating their alternate attachment to and removal from the harrow each time such change is required. This I secure by providing each axle $f$ with an upward-projecting arm, $e$, which arms are respectively connected by means of links $d$ $d'$ with an operating-lever, D, fulcrumed to a standard, $c$, carried by the harrow-section. This standard is provided with a segmental rack portion, with which engages a spring-dog, $x$, carried by the lever, whereby the parts are locked in any desired position. The links $d$ $d'$ are connected with the lever D respectively below and above its fulcrum, whereby a movement of the lever will cause a similar movement, either rising or falling, of the wheels $g$. The arms $e$ are provided with a series of apertures, with any ones of which the links $d$ $d'$ may engage, whereby the relative extent of movement of the wheels upon movement of the lever may be varied.

From the foregoing description it will be seen that the operator may easily cause the harrow to ride either upon the wheels or upon the teeth; or if it be found that the latter cut too deeply into the earth, the wheels may be adjusted so as to sustain the harrow after the teeth have entered to the proper depth.

When a harrow of three sections, such as shown in Fig. 1, is being transported upon the wheels $g$, which are carried entirely by the middle section, the outer sections are folded upward upon the couplings $a^2$ as hinges, as indicated by the dotted lines, Fig. 4, where they may be secured in any desired manner.

The draft devices consist of a pole, $l$, connected with the harrow by the rods or links $q$ $r$, flexibly jointed by the eyes 3 to the harrow-section. This pole may carry the whiffletree in the usual manner. When two or more sections are employed in making up the harrow, an evener-bar, $t$, secured to the pole and to the outer harrow sections by the links $r'$, is employed. This bar is hinged at the points $u$ $u$ in line with the couplings $a^2$, so as to permit the outer harrow-sections to be folded up, when the outer parts of the evener-bar move with them, as indicated by the dotted lines, Fig. 6.

Without limiting myself to the precise construction and arrangement of parts shown, I claim—

A harrow composed of sections flexibly connected to each other by loop-like couplings $a^2$, and each composed of tooth-carrying bars $m$, connected to each other centrally by the cross-bar $b$ and at their ends by the loop-like couplings $a$, the evener-bar $t$, composed of as many sections as there are harrow-sections hinged to each other in line with the couplings $a^2$, and draft rods or links between each harrow section and section of the evener-bar, substantially as described.

ROBERT G. PATTON.

Witnesses:
W. W. HAMMOND,
HENRY P. AYRES.